United States Patent [19]

Burnett

[11] 4,188,295
[45] Feb. 12, 1980

[54] APPARATUS FOR CHLORINATING AND FILTERING WATER FOR SWIMMING POOLS DURING FILLING OPERATION

[75] Inventor: Willis R. Burnett, Orlando, Fla.

[73] Assignee: Mid-Florida Pools and Repair, Inc., Orlando, Fla.

[21] Appl. No.: 824,360

[22] Filed: Aug. 15, 1977

[51] Int. Cl.² .......................... C02B 1/36; E04H 3/20
[52] U.S. Cl. .................................... 210/206; 137/268; 210/169; 210/199; 210/416 AS; 239/310; 422/263; 422/282
[58] Field of Search ............. 23/267 R, 267 B, 267 F, 23/272.7; 137/101.11, 268; 210/60, 62, 64, 167, 169, 194, 198 R, 199, 206, 416 AS, 430, 462; 239/1, 310; 422/263, 282

[56] References Cited

U.S. PATENT DOCUMENTS

| | | | |
|---|---|---|---|
| 2,220,706 | 11/1940 | Cantin | 210/430 |
| 3,474,817 | 10/1969 | Bates | 137/268 |
| 3,495,948 | 2/1970 | Long et al. | 23/272.7 |
| 3,595,786 | 7/1971 | Horvath et al. | 210/198 R |
| 3,887,468 | 6/1975 | Bray | 210/206 |
| 3,899,425 | 8/1975 | Lewis | 210/169 |
| 3,937,399 | 2/1976 | Halley | 210/169 |
| 4,023,778 | 5/1977 | Joly et al. | 239/310 |
| 4,059,522 | 11/1977 | Polley et al. | 210/169 |

*Primary Examiner*—Robert H. Spitzer
*Assistant Examiner*—Peter A. Hruskoci
*Attorney, Agent, or Firm*—Duckworth, Hobby, Allen & Pettis

[57] ABSTRACT

A chlorinator and filter for treating water during the filling of a swimming pool includes a hollow cylindrical tube and a first cap member over one end of the tube, with an opening therein. A nozzle cooperates with the cap member and extends through the opening for directing a stream of water axially through the tube. A second cap member is included over the other end of the tube, with an outlet extending substantially transverse to the access of the tube. A generally cylindrical stick of chlorine is positioned in the tube, the stick being supported by the second cap member against the flow of water from the nozzle. The stick has an outer diameter slightly smaller than the inner diameter of the tube, such that a substantial surface area of the stick is present for erosion at a relatively high rate, caused by a relatively high water pressure with respect to the pressure of the nozzle.

6 Claims, 4 Drawing Figures

APPARATUS FOR CHLORINATING AND FILTERING WATER FOR SWIMMING POOLS DURING FILLING OPERATION

BACKGROUND OF THE INVENTION

1. Field of the Invention

The present invention relates to apparatus for chlorinating and filtering swimming pools, and in particular relates to such apparatus which specifically is designed to chlorinate and filter water to be used for initially filling the swimming pool.

2. Description of the Prior Art

The prior art includes numerous suggestions of structures and methods for adding chlorine to swimming pool water. Generally, these arrangements are designed to add chlorine to the water when the pool is filled, the chlorine being added at a relatively slow, uniform rate as the water is circulated through a chlorinator and filter unit. An example of such an arrangement is disclosed by Lewis in U.S. Pat. No. 3,899,425.

A somewhat similar arrangement is disclosed by Edmonson in U.S. Pat. No. 3,957,644. See also, U.S. Pat. No. 3,129,172 to Dickey, et al.

Other prior art of interest include the following: U.S. Pat. Nos. 3,401,116 to Stanwood; 3,772,193 to Nelli, et al.; and 3,937,399 to Halley.

While many of the structures disclosed in the above references and in the prior art are useful in adding chlorine to swimming pool water in small, uniform amounts during circulation of that water through the chlorination unit, these arrangements are not designed to be portable in nature with a filtration unit, and for high rates of water flow, in order to be useful when adding water to the swimming pool in the first instance.

SUMMARY OF THE INVENTION

The present invention contemplates apparatus useful for chlorinating and filtering water for swimming pools during an initial filling operation. In a preferred embodiment, the apparatus includes a housing having an internal chamber, with an inlet extending through the housing and communicating with the chamber. The inlet is adapted to provide a stream of water into the chamber which is to fill the swimming pool.

The apparatus further includes a solid body of a chlorine containing material within the housing, and an outlet communicating through the housing and spaced from the inlet, with the outlet adapted to receive the water after erosion of the chlorine body. Means are provided for constantly biasing the chlorine body toward the stream of water passing through the inlet, whereby the chlorine body is rapidly and uniformly eroded by the stream throughout the filling operation.

In the preferred embodiment of the present invention, the apparatus is further provided with bypass means communicating between the housing and the inlet, with further means for developing a high pressure in bypass means with respect to the stream from the inlet. This bypass means serves to concentrate the amount of chlorine in the water passing through the outlet, allowing the entire amount of water to be uniformly chlorinated during a rapid filling operation.

Other features of the present invention include the simple structure of the arrangement, thereby facilitating its portable nature.

DETAILED DESCRIPTION

A preferred embodiment of the present invention will now be described with reference to FIGS. 1 and 2.

Figure 1:
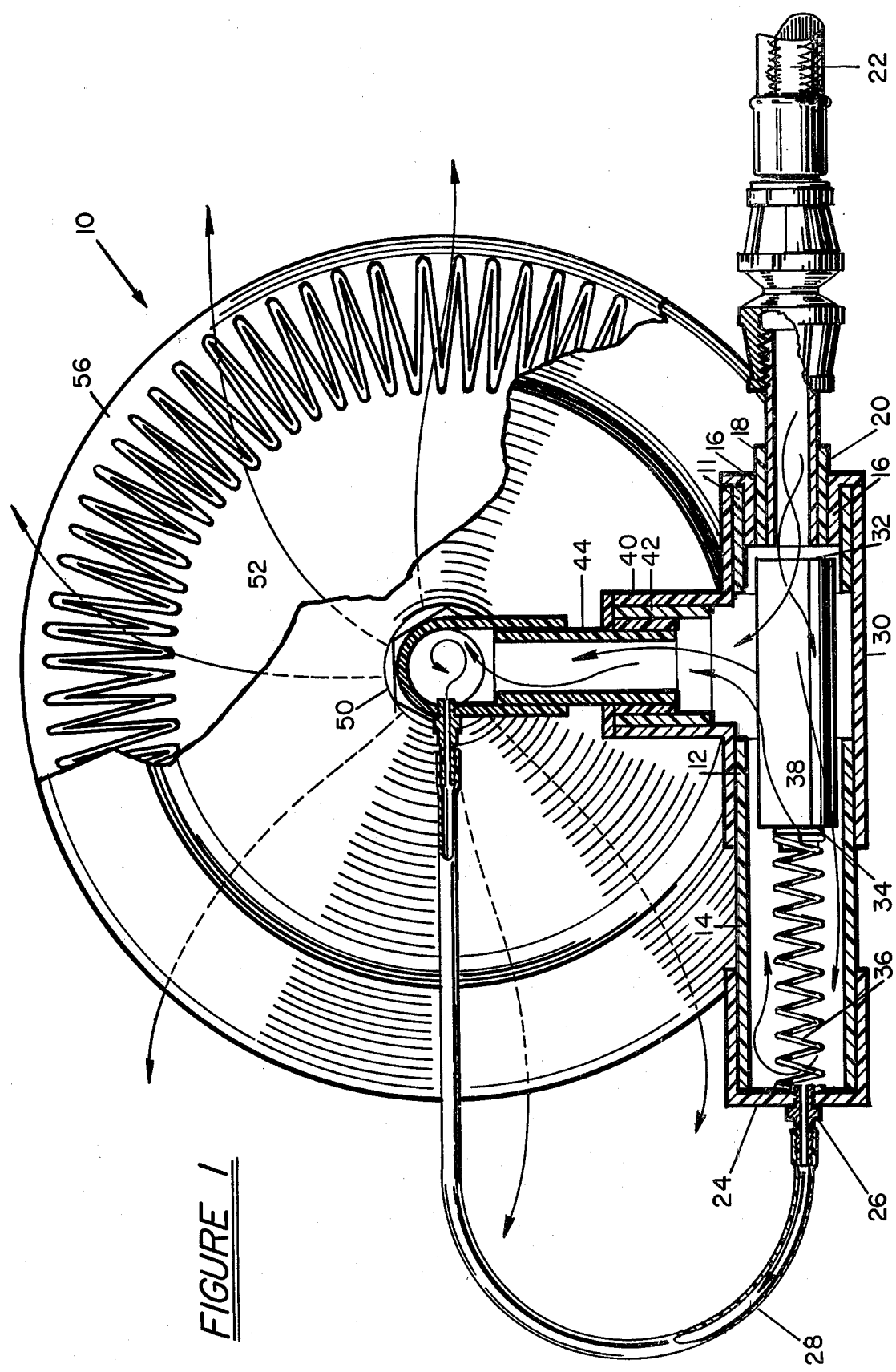
FIG. 1 is a cross-section of a portion of the preferred embodiment in accordance with the present invention.
Figure 2:
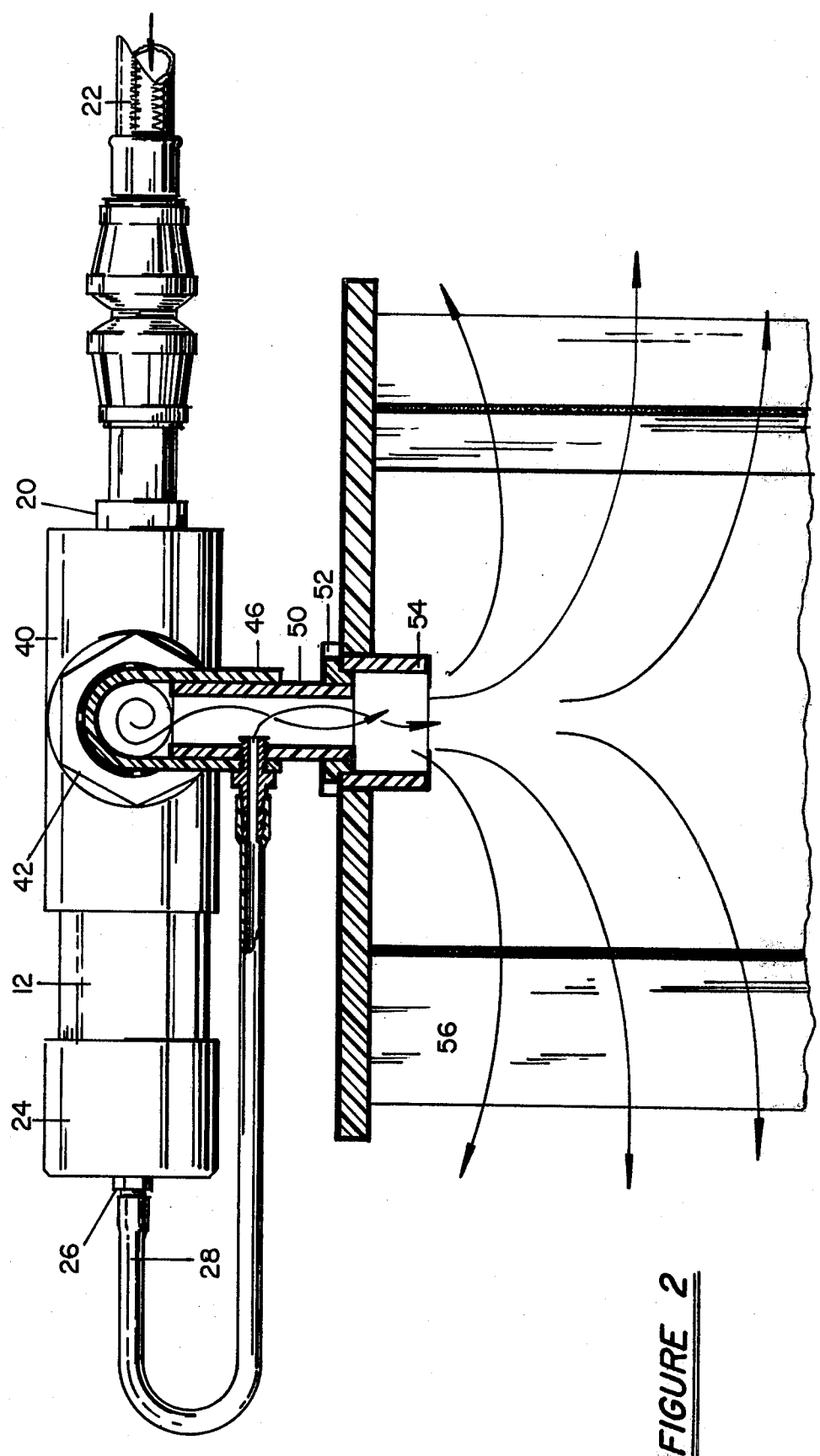
FIG. 2 is another view, partially in cross-section, illustrating the preferred embodiment of the present invention.

Noting FIG. 1, the chlorinator and filter, referred to generally as 10, includes a hollow, cylindrical tube formed of two spaced sections 11, 12. The tube 11, 12 forms a chamber 14 therein. While the type of material from which the various parts of the apparatus 10 is made is not critical, it has been found that polyvinyl chloride tubing and fittings is suitable for these purposes.

The chamber 14 is further defined by a first cap 16, such as a conventional PVC connecting bushing. The first cap 16 has an opening 18 passing therethrough axial with the tube 11, 12. A nozzle 20 of restricted cross-sectional area with respect to the tube 11, 12 is positioned in the opening 18 and extends axially a short distance into chamber 14. The nozzle 20 is connected to a water supply, which is shown symbolically by an arrow 22.

The opposite end of the tube section 12 is closed by a second cap 24 fitted thereon. The cap 24 has an opening 26 axial therethrough, the opening 26 being relatively small with respect to the nozzle 20. A by-pass tube 28 extends through the hole 26 to an outlet tubing 44, described in greater detail below.

A solid stick 30 of a chlorine containing material is positioned in the chamber 14. Preferably, the chlorine stick 30 has a shape which is substantially identical to the shape of the tubing 11, 12 (that is generally cylindrical), and is dimensioned so as to create a small gap between the outer periphery of the stick 30 and the inner periphery of the cylindrical tube 11, 12. By way of example, the tubing 11, 12 may have an inner diameter of $1\frac{1}{2}''$ and the chlorine stick may have an outer diameter of $1\frac{1}{4}''$, leaving approximately $\frac{1}{8}''$ clear on either side of the chlorine stick between the walls defining the chamber 14. The chlorine stick 30 includes a flat, forward end 32, and a flat, rearward facing end 34.

The apparatus 10 further includes biasing means positioned between the second cap member 24, and the rearward end 34 of the chlorine stick 30. In this example, the biasing means include a spring 36 fitted into a cap member 38, so as to push the forward end 32 of the chloride stick 30 against the stream of water ejected into the chamber 14 by the nozzle 20.

The apparatus 10 further includes a T-shaped outlet member 40 surrounding the two sections 11, 12 and the space therebetween. The outlet member 40 includes an elbow 44 having one end 46 which is adapted to receive the other end of the bypass tube 28 from the second cap 24. A filter coupler 50 extends through the one end 46 of the outlet member 40, and includes a fitler plate 52, again preferably formed of a flexible material such as polyvinyl chloride. The filter coupler 50 is provided with a filter throat 54 extending from the filter plate 52. Preferably, the entire filter coupler 50 is formed of a single molded unit which is adapted to mate with a conventional filter 56.

In use, the nozzle 20 is connected to a water source 22, such as a conventional water hose. The entire apparatus 10 may then be placed in the bottom of the swimming pool which is to be filled.

During the filling operation, the water passing through the nozzle 20 forces the forward end 32 of the chlorine stick 30 against the pressure of the spring 36, causing the water from the nozzle to erode the edges of the chlorine stick. A major portion of the water including the eroded chlorine therein passes through the outlet member 40. However, a smaller amount of water passes along the chlorine stick, continuing to erode chlorine from the cylindrical side wall of the stick and into the space between the second cap member 24 and the rearward end 34 of the chlorine stick 30. Water contained in this space has a high concentration of chlorine therein. This water is forced out of the second cap member 24 via the bypass tube 28 and into the end 46 of the outlet 40. On occasion, the flow of water through the bypass tube 28 will be in the opposite direction, that is, out of the outlet member 40 and through the bypass tube 28 and into the chamber 14. In either event, there is a maximum amount of erosion of the chlorine stick 30 in a short period of time, causing an increased amount of chlorine to pass into the water exiting the chamber 14 via the outlet 40.

The water passing out of the outlet end 46 enters the filter 56 through the coupler unit 50, the filter serving to remove iron and other unwanted minerals and solid materials contained in the water.

Figure 3:
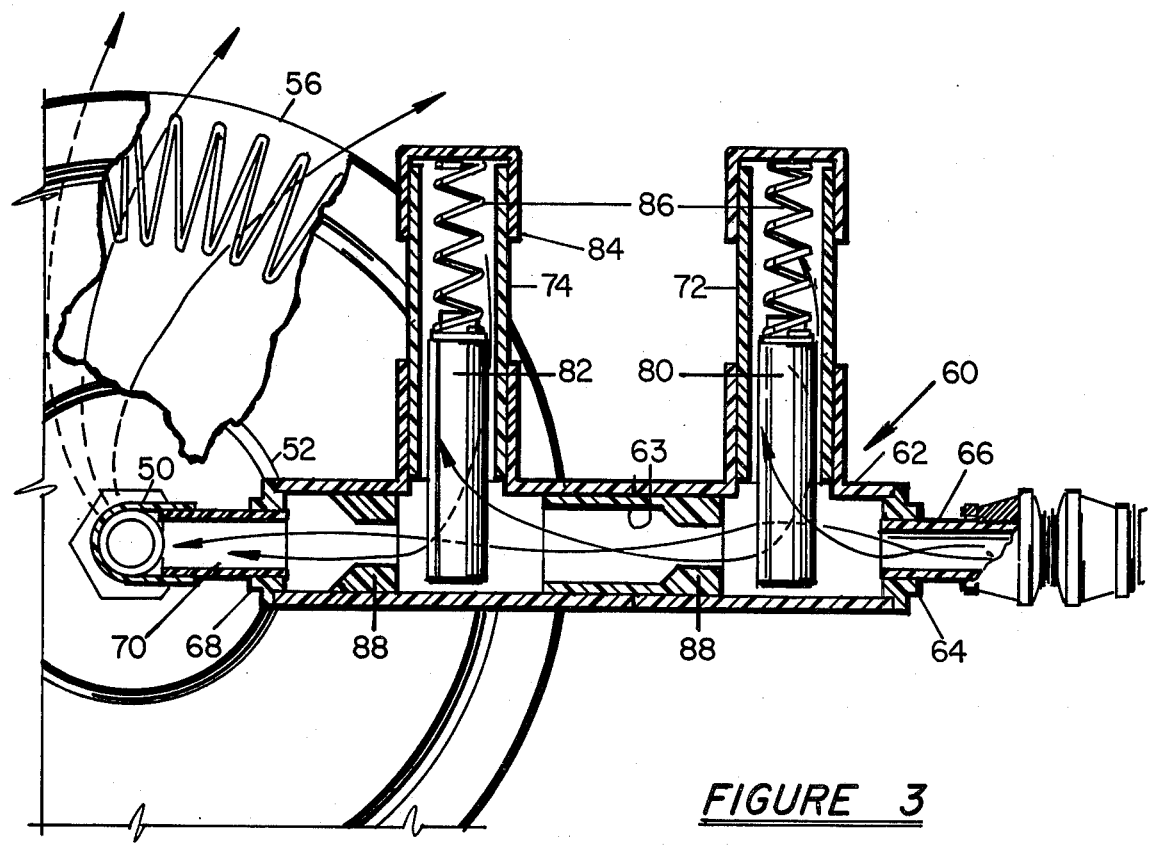
FIG. 3 is a cross-sectional view of a second embodiment of the present invention.

A second embodiment of apparatus in accordance with the present invention is shown in FIG. 3 and described with reference thereto.

The chlorinator 60 includes a first tube 62 defining a chamber 63 similar to the chamber 14 of FIG. 1. Chamber 63 is enclosed at one end by a first cap 64 having a nozzle 66 extending therethrough. A second cap member 68 is positioned over the opposite end of the first tube 62, and includes an outlet 70, essentially similar to the outlet 40 of FIG. 1 and which is coupled to the filter coupler 50. The coupler 50, which is essentially identical to the structure shown in FIGS. 1 and 2, includes a plate 52 and a filter 56 serving similar purposes as the corresponding structure shown in the previous drawings.

The chlorinator 60 is further provided with second and third tubes 72, 74 which extend through the first tube 62 and into the chamber 63. Each tube 72, 74 is provided with a cap member 76, 78 in a conventional manner. As shown in FIG. 3, it is preferred that the first and second tubes 72, 74 extend normal to the axial direction of the tube 62.

The chlorinator 60 is provided with two chlorine sticks 80, 82 which are respectively positioned within the second and third tubes 72, 74. Each chlorine stick is biased by a spring 84, 86 so as to force the forward end of the respective chlorine sticks, 80, 82 into the chamber 63 and in the flow path of water passing axially along the first tube 62.

Additionally, the chlorinator 60 is provided with baffles 88 located within the chamber 63, each baffle 88 being positioned adjacent the forward end of the respective chlorine stick, in order to create a back pressure adjacent that end to substantially increase the erosion of chlorine from the stick. In the specific arrangement of FIG. 3, the baffle comprises a restricted throat downstream from the respective chlorine stick. In use, the water flowing from the nozzle 66 swirls about the forward end of the chlorine stick and slightly upward in the respective second and third tubes 72, 74, causing a substantial erosion of the chlorine stick 80, 82. Thereafter, the chlorinated water passes out of the outlet 70 into the filter 56.

Figure 4:
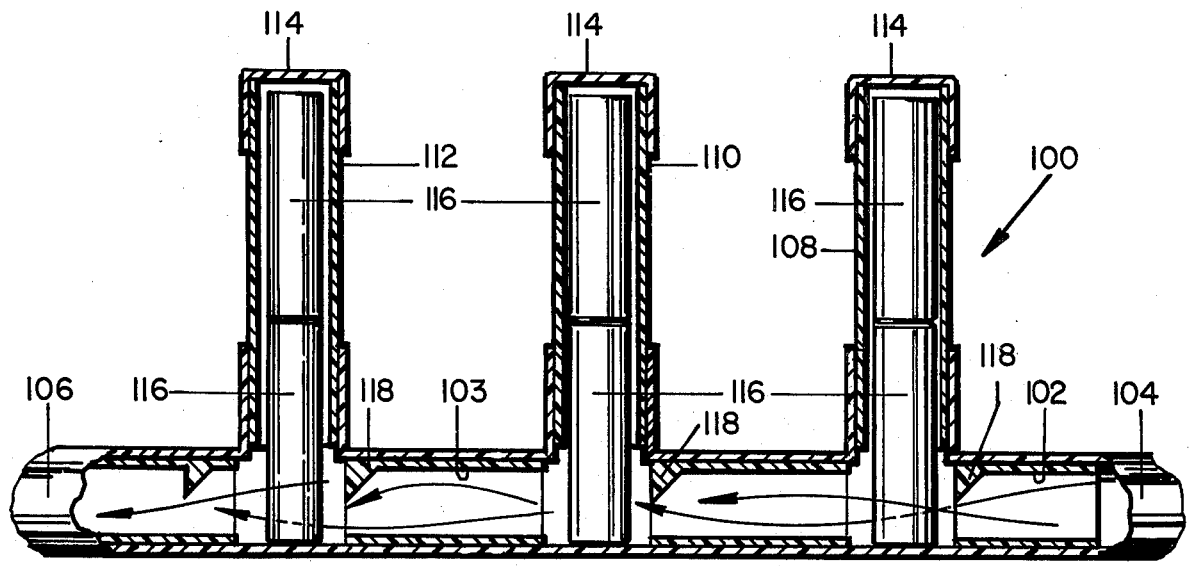
FIG. 4 is a cross-sectional view of a third embodiment of the present invention.

A third embodiment of apparatus in accordance with the present invention is shown in FIG. 4 and described with reference thereto.

The chlorinator of FIG. 4, referred to generally as 100, includes a first, cylindrical tube 102 having a hollow chamber 103 therein. The chamber 103 is defined by a cap member 104 and a nozzle (not shown) extending through that cap member. A second cap member 106 provides an outlet in a conventional manner.

The chlorinator 100 is further provided with second, third and fourth tubes 108, 110 and 112 respectively, each of which extends transverse to the first tube 102 and communicates with the chamber 103. Each of the second, third and fourth tubes 108, 110 and 112 has a cap 114 over the upper end thereof. As shown in FIG. 4, the chlorinator 100 is arranged so that the second, third and fourth tubes 108, 110 and 112 extend vertically from the first tube 102.

A plurality of chlorine sticks 116 are provided, two of the sticks being mounted axially in each of the second, third and fourth tubes 108, 110 and 112. The chlorine sticks 116 are gravity fed into the chamber 103, so as to be eroded by the stream of water flowing in from the inlet cap 104. In a manner similar to the arrangement of FiG. 3, the chlorinator 100 is provided with baffles 118, each baffle being positioned upstream from a respective one of the second, third and fourth tubes 108, 110 and 112 so as to create a back pressure so as to restrict the amount of water flowing across the end of the respective one of the chlorine sticks 116. In this way, erosion of the end of the lower-most chlorine stick 116 in each of the three vertical tubes is facilitated in a uniform manner. The outlet 106 is coupled to a filter coupler 50 in the manner described above with reference to FIGS. 1–3.

The arrangements described above provide a highly portable chlorinator and filter arrangement which may be utilized for the operation of filling a pool for the first time. Typical prior art chlorinators, as described above, have as their purpose the relatively slow chlorination of the water in a circulating, timed system. The function of the system herein described is to add the required amount of chlorine during the initial filling operation, in which a large amount of water is directed into the swimming pool in a relatively short period of time.

I claim:

1. Apparatus for chlorinating swimming pools during a filling operation comprising:
   a hollow, cylindrical tube;
   a first cap member over one end of said tube and having an opening therein;
   a nozzle cooperating with said cap member and extending through said opening for directing a stream of water axially through said tube;
   a second cap member over the other end of said tube having an opening therein;
   a tube outlet extending substantially transverse to the axis of said tube for feeding chlorinated water to said swimming pool;
   a generally cylindrical stick of chlorine positioned in said tube, said stick being supported by biasing means between said stick and said second cap member for biasing said stick against the flow of water from said nozzle, said stick being positioned adjacent said tube outlet so that a major portion of said flow of water contacts said stick and flows directly through said tube outlet;

a bypass tube having a smaller cross-section than said outlet and communicating between said opening in said second cap member and said tube outlet at a point distal from said inlet, said bypass tube receiving water passing along said stick and having a higher chlorine content than water passing into said outlet;

means for developing a high pressure in said bypass tube with respect to said stream from said inlet; and wherein said stick has an outer diameter slightly smaller than the inner diameter of said tube, such that a substantial surface area of said stick is present for erosion at a relatively high water pressure with respect to the pressure at said nozzle.

2. The apparatus recited in claim 1 wherein:

said stick has a relatively flat end surface; and said nozzle is positioned to force said stream against said end surface and across the peripheral edge thereof.

3. The apparatus recited in claim 1 wherein said biasing means comprises a spring between said second cap member and said stick for biasing said stick toward said nozzle.

4. The apparatus recited in claim 1 further comprising filter means coupled to said outlet.

5. The apparatus recited in claim 4 wherein said filter means comprises:

a filter receiver tube coupled to said outlet;

a filter plate surrounding said receiver tube; and a removable filter element having an opening therein, said element adapted to snugly mate with said receiver tube extending into said opening.

6. The apparatus recited in claim 1 further comprising said stick having a shape generally conforming to the shape of said tube and having an outer dimension slightly less than the inner dimension of said tube.

* * * * *